United States Patent [19]
Okamura

[11] Patent Number: 6,085,309
[45] Date of Patent: Jul. 4, 2000

[54] SIGNAL PROCESSING APPARATUS

[75] Inventor: Kazuhisa Okamura, Hamamatsu, Japan

[73] Assignee: Yamaha Corporation, Hamamatsu, Japan

[21] Appl. No.: 09/001,992

[22] Filed: Dec. 31, 1997

[30] Foreign Application Priority Data

Jan. 8, 1997 [JP] Japan ........................................ 9-11879
Jan. 14, 1997 [JP] Japan ........................................ 9-17466

[51] Int. Cl.⁷ ............................... G10H 7/12; G10H 1/26; G06F 9/40
[52] U.S. Cl. ....................... 712/35; 984/389; 84/DIG. 26; 381/63
[58] Field of Search .................................... 310/286, 435, 310/522; 348/720; 84/630, 626, DIG. 26; 381/63; 984/308, 389; 712/35, 36

[56] References Cited

U.S. PATENT DOCUMENTS 4,570,523  2/1986  Futamorl et al. .
4,731,835  3/1988  Futamase ................................ 381/63
4,825,287  4/1989  Baji et al. .

FOREIGN PATENT DOCUMENTS 6-195073  7/1994  Japan .
6-259249  9/1994  Japan .

*Primary Examiner*—Daniel H. Pan
*Attorney, Agent, or Firm*—Graham & James LLP

[57] ABSTRACT

A signal processing apparatus executes a plurality of microprograms stored in a microprogram memory device in a time-sharing manner, so as to perform arithmetic operations on a digital signal entered by a signal input device. A delay memory device that delays the digital signal. The delay memory device has a plurality of delay areas that are independently provided for the respective microprograms, such that each of the microprograms that is being executed uses a corresponding one of the plurality of delay areas so as to delay the digital signal, and a common area that can be accessed by all of the microprograms. As a result, data such as tables for use in common by the plurality of microprograms can be stored, and the stored data can be easily used by each microprogram, without making the system complicated or increasing the cost of the apparatus.

13 Claims, 10 Drawing Sheets

FIG.7

| STARTING STEP SS |
|---|
| — |
| SS2 |
| SS3 |
| SS4 |
| SS5 |
| SS6 |
| "0" |
| — |

| STARTING ADDRESS TAD |
|---|
| TAD1 |
| TAD2 |
| TAD3 |
| TAD4 |
| TAD5 |
| TAD6 |
| — |
| — |

| BANK SIZE |
|---|
| BS1 |
| BS2 |
| BS3 |
| BS4 |
| BS5 |
| BS6 |
| — |
| — |

*FIG.10A* *FIG.10B* *FIG.10C*
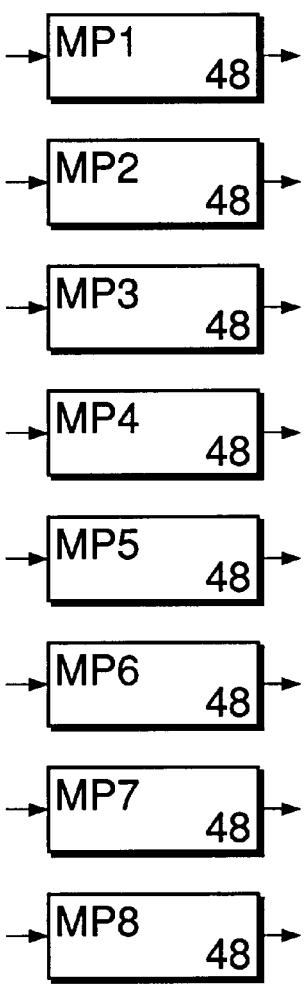
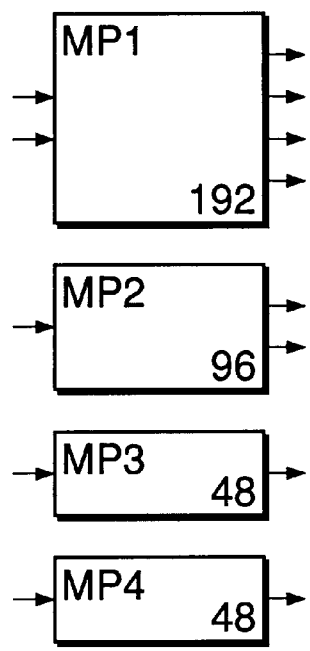
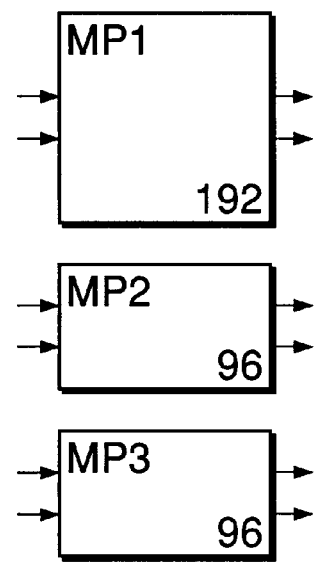

SIGNAL PROCESSING APPARATUS

BACKGROUND OF THE INVENTION

1. Field of the Invention

The present invention relates to a signal processing apparatus that executes a plurality of microprograms in a time-sharing manner, to perform various arithmetic operations on digital signals.

2. Discussion of Related Art

Electronic musical instruments have been known which use DSP (digital signal processor), for example, for imparting sound effects, such as distortion or reverb, to musical tones, as disclosed in Japanese Laid-open Patent Publication No. 6-259249. Such an electronic musical instrument executes a plurality of microprograms corresponding to respective sound effects in a time-sharing manner (concurrently), so that a plurality of sound effects (five effects, for example) are imparted to musical tones. In this case, the microprograms corresponding to the respective sound effects use a delay memory for delaying musical tone signals, and perform processing for providing desired sound effects, using the delayed signals as needed.

A signal processing apparatus as proposed in the above-identified publication is capable of changing one of five sound effects, for example, into another sound effect during performance, by changing an appropriate microprogram to be executed, according to a command entered by the user. This apparatus is able to execute a total of five microprograms in a time-sharing manner, by selecting three kinds of microprograms having different step numbers (24, 56 and 96 steps).

In the known signal processing apparatus, the delay memory is divided into a plurality of storage areas corresponding to a plurality of microprograms, and each of the storage areas can be accessed only by a corresponding one of the microprograms. Where the delay memory stores any table or waveform data that is shared or used in common by all of the microprograms, the same data is stored in the respective storage areas into which the delay memory is divided, resulting in a waste of the capacity of the memory.

Also, the known apparatus as described above executes a fixed number of microprograms in a time-sharing manner, namely, the number of microprograms to be executed is determined to be five, and the size of each program (the number of steps) is only selected from the three kinds as described above, and cannot be changed to other values than the above-indicated three values.

In the known apparatus, each of the microprograms executed in a time-sharing manner uses a fixed number of input channel(s) and output channel(s). This arrangement may result in undesirable situations: namely, two input channels are inevitably used even if a monophonic input is satisfactory, or more output signals are desired to be generated in parallel, but cannot be generated due to the fixed number of output channels.

In the known apparatus using a signal delay memory for imparting sound effects to musical tones, data that is written into the signal delay memory is generally compressed by converting 32-bit data into 16-bit data by floating-point conversion, for example. The data compression is intended for preventing the capacity of the delay memory from being excessively large. As a result of the compression, the accuracy of delayed data may be reduced, and noises that are not negligible may occur, resulting in deteriorated quality of musical tones generated by the apparatus.

SUMMARY OF THE INVENTION

It is therefore the first object to provide a signal processing apparatus that provides a storage area for storing data that is used in common or shared by a plurality of microprograms, such that the stored data can be easily used by each microprogram, without making the system complicated or increasing the cost of the apparatus.

It is the second object to provide a signal processing apparatus that is able to change microprograms in a more flexible manner, assuring increased ease with which the apparatus is used.

It is the third object to provide a signal processing apparatus in which input channels and/or output channels can be more appropriately allocated to each microprogram using these channels.

It is the fourth object to provide a signal processing apparatus that performs appropriate compression processing when a signal delay memory is used, so as to ensure required accuracy of data while preventing an unnecessary increase in the capacity of the delay memory.

To attain the first object, the present invention provides a signal processing apparatus for executing a plurality of microprograms in a time-sharing manner, so as to perform arithmetic operations on a digital signal, comprising a microprogram memory device that stores the plurality of microprograms, a signal input device that enters the digital signal, and a delay memory device that delays the digital signal, wherein the delay memory device has a plurality of delay areas that are independently provided for the respective microprograms, such that each of the microprograms that is being executed uses a corresponding one of the plurality of delay areas so as to delay the digital signal, and a common area that can be accessed by all of the microprograms.

In the signal processing apparatus constructed as described above, the delay memory device provides a common area that can be accessed by all of the microprograms, as well as a plurality of delay areas each of which is exclusively used by a corresponding one of the microprogram when it is being executed. As a result, data such as tables for use in common by the plurality of microprograms can be stored, and the stored data can be easily used by each microprogram, without making the system complicated or increasing the cost of the apparatus. That is, it is not necessary to provide a plurality of sets of data such as tables for the plurality of programs, respectively, enabling reduction of the storage area for storing the tables and others as well as reduction of processing for writing the table and others into the delay memory device.

Preferably, the signal processing apparatus further comprises an execution halting device that halts execution of a part of the plurality of microprograms while executing the microprograms other than the part of the plurality of microprograms, and a device that allows an external processing device to access the common area of the delay memory device in an operating period that is allocated to the part of the microprograms whose execution is being halted.

In this arrangement, the external processing device is able to access the common area when execution of a part of the plurality of microprograms is halted. As a result, the data stored in the common area can be easily carried out by the external processing device.

To attain the first object, the present invention provides a signal processing apparatus for executing a plurality of microprograms in a time-sharing manner, so as to perform arithmetic operations on a digital signal, comprising a signal input device that enters the digital signal, a first memory device that stores the plurality of microprograms, a read-out device that sequentially reads out the plurality of microprograms in a time-sharing manner, a determining device that determines which one of the plurality of microprograms is being read out by the read-out device, a second memory device that has a plurality of delay areas corresponding to the plurality of microprograms, respectively, and a common area provided in addition to the delay areas, and an arithmetic processing device that performs the arithmetic operations based on the microprogram read out by the read-out device, the arithmetic operations including delay processing in which the arithmetic processing device accesses one of the delay areas that corresponds to one of the microprograms that is being executed, based on a result of determination by the determining device, and further including constant access processing in which the arithmetic processing device accesses the common area irrespective of the determination by the determining device.

In the apparatus as described above, the second memory device provides a common area in addition to a plurality of delay areas corresponding to a plurality of microprograms. The delay area corresponding to the microprogram that is being executed is accessed when delay processing is performed on the input digital signal, and the common area is accessed irrespective of which of the microprograms is being executed when constant access processing is performed. As a result, data such as tables for use in common by the plurality of microprograms can be stored, and the stored data can be easily used by each microprogram in the constant access processing, without making the system complicated or increasing the cost of the apparatus. That is, it is not necessary to provide a plurality of sets of data such as tables for the plurality of programs, respectively, enabling reduction of the storage area for storing the tables and others as well as reduction of processing for writing the table and others into the second memory device.

To attain the second object, the present invention provides a signal processing apparatus comprising a first memory device that stores a plurality of microprograms, and has a plurality of storage areas, a second memory device that stores control information indicating the storage areas of the respective microprograms stored in said first memory device, a selecting device that selects said plurality of microprograms, a writing device that sequentially writes the plurality of microprograms selected by said selecting device into different ones of said storage areas of said first memory means, and writes into said second memory device said control information indicating the storage areas into which the respective microprograms are written, a read-out device that reads out said plurality of microprograms stored in said first memory device in a time-sharing manner in each sampling period, a processing device that performs waveform signal processing based on said plurality of microprograms read out by said read-out device, a halt command generating device that generates a command by a user to halt a part of the waveform signal processing that is being performed by said processing device, a determining device that determines one of the microprograms that is being read out by said read-out device, based on the control information stored in said second memory means, and a halting device that selectively halts execution of said one of the microprograms that is to be halted, according to a result of determination by said determining device, when said halt command generating device generates the command.

In the apparatus as described above, a plurality of microprograms having a desired number of steps are executed in parallel by time sharing, and only the execution of a desired microprogram selected from the plurality of microprograms is halted in response to the halt command. As a result, the range of selection of microprograms that can be executed can be increased, assuring increased ease with which the apparatus is used. Further, during halting of execution of the microprogram, rewriting and clearing of the storage area of the delay memory device used by the microprogram can be carried out.

To attain the second object, the present invention also provides a signal processing apparatus comprising a first memory device that stores a plurality of microprograms, and has a plurality of storage areas, a second memory device that stores control information indicating the storage areas of the respective microprograms stored in the first memory device, a read-out device that reads out the plurality of microprograms stored in the first memory means in a time-sharing manner in each sampling period, a processing device that performs waveform signal processing based on the plurality of microprograms read out by the read-out device, a change command generating device that generates a command by a user to change a part of the waveform signal processing performed by the processing device into another waveform signal processing, a determining device that determines one of the microprograms that is being read out by the readout means, based on the control information stored in the second memory means, and a changing device that selectively halts execution of the one of the microprograms that is to be changed in response to the command generated by the change command generating device, according to a result of determination by the determining device, and writes a new microprogram into the storage area of the microprogram to be changed in a period of execution of the microprogram to be changed.

In the apparatus as described above, a plurality of microprograms having a desired number of steps are executed in parallel by time sharing, and only the execution of a microprogram to be changed, out of the plurality of the microprograms, is selectively halted in response to the change command, while a new microprogram is written into the storage area of the microprogram to be changed in a period of execution of the microprogram that has been halted. As a result, the range of selection of microprograms that can be executed can be enlarged, assuring increased ease with which the apparatus is used. Further, a desired program can be written into the storage area while execution of other microprogram(s) is continued.

To attain the third object, the present invention provides a signal processing apparatus for executing a plurality of microprograms in a time-sharing manner, so as to perform arithmetic operations on a digital signal, comprising a microprogram memory device that stores the plurality of microprograms, a signal input device that enters the digital signal, a first predetermined number of input channels that receive the digital signal that is to be processed, a second predetermined number of output channels that output the digital signal that has been processed, and a setting device that determines at least one of which input channel(s) of the first predetermined number of input channels is/are used for each of the plurality of microprograms, and which output channel(s) of the second predetermined number of output channels is/are used for each of the microprograms.

In the apparatus as described above, the setting device determines which input channel(s) of the first predetermined number of input channels is/are used for each of the plurality of microprograms that are executed in a time sharing manner, and/or which output channel(s) of the second predetermined number of output channels is/are used for each microprogram As a result, setting of channels can be carried out for each microprogram, making it possible to use a limited number of input and output channels in an efficient manner.

To attain the fourth object, the present invention provides a signal processing apparatus for executing a plurality of microprograms in a time-sharing manner, so as to perform arithmetic operations on a digital signal, comprising a microprogram memory device that stores the plurality of microprograms, a signal input device that enters the digital signal, a delay memory device used when the digital signal is delayed, and a data converting device that performs compression processing on the digital signal to write the compressed digital signal into the delay memory device, and performs decompression processing reverse to the compression processing when reading out the digital signal, so as to output the decompressed digital signal, wherein the data converting device is able to change a first mode of the compression processing into a second mode and vice versa, and change a first mode of decompression processing into a second mode and vice versa.

In the apparatus as described above, compression processing is performed on the digital signal, and the compressed signal is then written into the delay memory device, while decompression processing reverse to the compression processing is performed on the digital signal when it is read out, and the decompressed signal is then generated. The mode of compressing processing and that of decompressing processing are changed to other modes as needed. As a result, the storage area of the delay memory device may be saved where highly accurate delay signals are not needed, and if necessary, highly accurate delay signals may be still obtained.

The above and other objects, features, and advantages of the invention will become more apparent from the following detailed description taken in conjunction with the accompanying drawings.

BRIEF DESCRIPTION OF THE DRAWINGS

FIG. 7 is a block diagram showing the construction of a 16-32 converter appearing in FIG. 3;

FIGS. 10A–10C are views showing examples of microprograms, indicating the number of microprograms, number of steps, and input and output channels used by each microprogram.

DETAILED DESCRIPTION

The present invention will be described in detail with reference to the drawings showing a preferred embodiment thereof.

Figure 1:
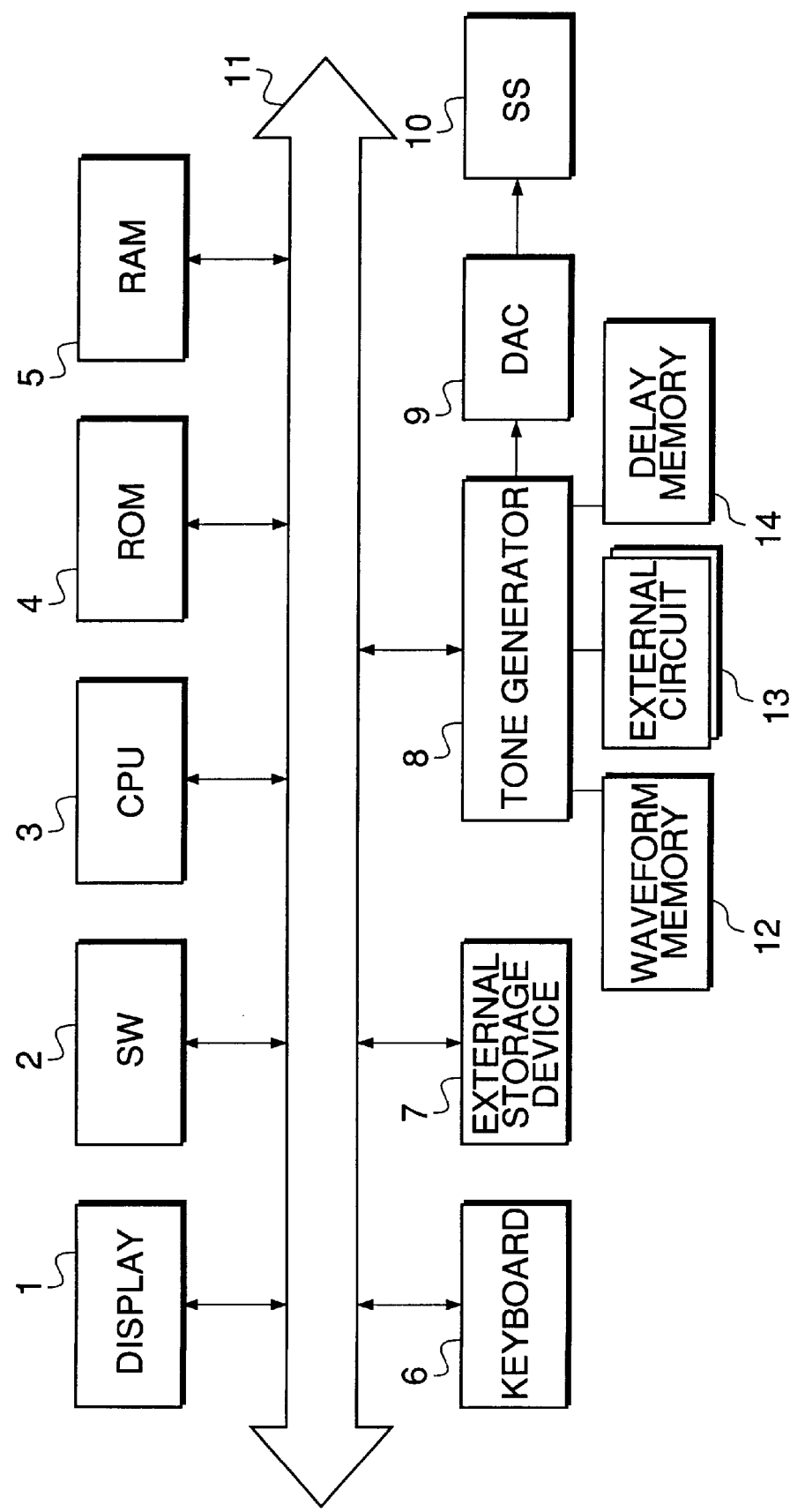
FIG. 1 is a block diagram showing the construction of an electronic musical instrument according to one embodiment of the present invention.

Referring first to FIG. 1, there is illustrated in a block diagram the construction of an electronic musical instrument according to one embodiment of the present invention. This electronic musical instrument includes a display 1 for displaying various kinds of information, such as the name of selected sound effect(s), a switch panel 2 that is operated by the user when selecting a tone color, sound effect, and the like, a CPU 3 that controls the whole system of the electronic musical instrument, a ROM 4 that stores programs to be executed by the CPU 3, tables needed for executing the programs, and so forth, and a RAM 5 that is used as a working area of the CPU 3 and stores data that is being processed by the CPU 3, and the like. The electronic musical instrument further includes a keyboard 6 that is operated by the user to give a performance, an external storage device 7 that stores performance data and other data, a tone generator 8 for producing musical tone signals in accordance with key-depressing operations performed on the keyboard 6, a system bus 11 that connects these constituent elements 1 through 8 to each other, a DA converter 9 that converts digital signals generated by the tone generator 8 into equivalent analog signals, and a sound system 10 that amplifies the musical tone signals output from the DA converter 9, and outputs the amplified signals by way of a loudspeaker. To the tone generator 8 are connected a waveform memory 12 used for producing musical tone signals, an external circuit 13 such as an external effecter, and a delay memory 14 used for imparting sound effects to the musical tone signals.

The CPU 3 detects manipulation of switches on the switch panel 2, to determine the tone color and sound effects desired by the user based on the switches manipulated, and also detects key-depressing operations on the keyboard 6 so as to control the tone generator 8 in accordance with the key-depressing operations. When depression of any one of keys on the keyboard 6 is detected, for example, the CPU 3 allocates one of thirty-two tone-generation channels of the tone generator 8 to a task of generating a musical tone that corresponds to the depressed key, produces a control signal for the selected musical tone in accordance with the key-depressing operation, and writes the produced control signal into a control register of the tone generator 8 as a control signal for the allocated tone-generation channel, to thereby start production of the musical tone corresponding to the depressed key. In addition, the tone generator 8 imparts currently selected sound effect(s) to the musical tone to be produced, and transmits the resulting digital signal provided with the effect(s) to the DA converter 9 for conversion into an equivalent analog signal, which is then supplied to the sound system 10.

Figure 2:
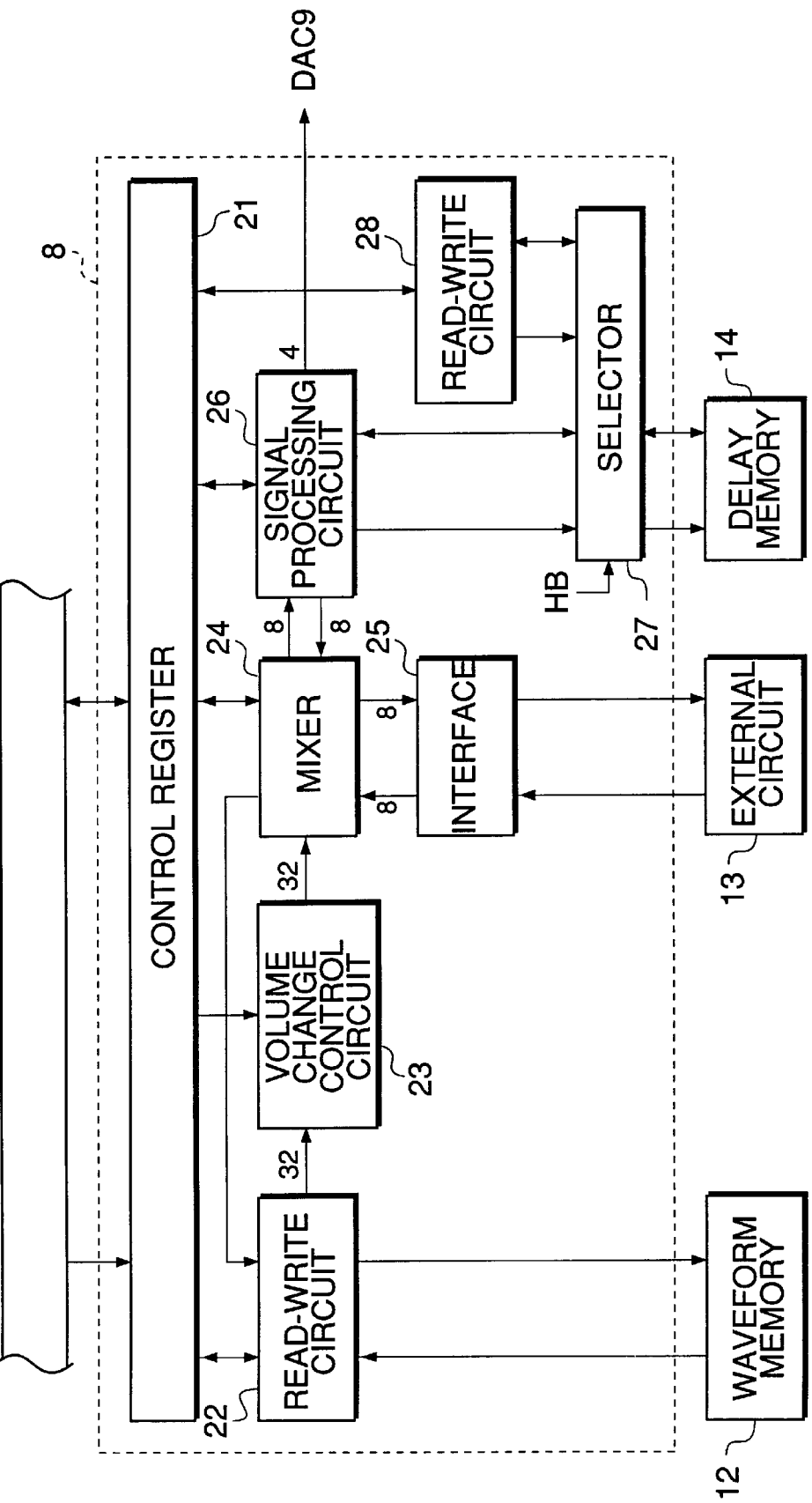
FIG. 2 is a block diagram showing the construction of a tone generator appearing in FIG. 1.

FIG. 2 shows in detail the construction of the tone generator 8. The tone generator 8 includes a control register 21 that is connected to the system bus 11 and has various types of registers into which control signals from the CPU 3 are written, a read-write circuit 22 that reads out waveform data from the waveform memory 12 in accordance with a control signal from the control register 21, so as to perform interpolation processing for converting the waveform data into that of a desired pitch, for example, a volume change control circuit 23 for providing an envelope to the output signal of the read-write circuit 22 according to a control signal from the control register 21, and a mixer 24 that mixes input signals by suitably adjusting their levels. The tone generator 8 further includes an interface circuit 25 that is interposed between the mixer 24 and the external circuit 13, a signal processing circuit 26 that is constituted by a DSP (digital signal processor) to perform processing for imparting various types of sound effects to musical tone data, a selector 27 for selecting data to be written into or read out from the delay memory 14, and a read-write circuit 28 that performs read-write control when the CPU 3 directly accesses the delay memory 14.

The read-write circuit 22 and volume change control circuit 23 perform time-share operations on the thirty-two tone-generation channels, according to the control signals stored in the control register 21 for each tone-generation channel, so as to produce thirty-two musical tone waveforms. The read-write circuit 22 reads out waveform data for the thirty-two channels in a time-sharing manner from the waveform memory 12 in each sampling period (of 1/48 kHz, for example), and performs interpolation processing on the read waveform data so as to output by time sharing thirty-two interpolated samples having pitches designated for respective channels. The volume change control circuit 23 gives an independent volume envelope for each tone-generation channel to each of the thirty-two interpolated samples in a time-sharing manner, based on the control signal from the control register 21, and outputs the resulting tone signal to the mixer 24.

The mixer 24 functions to mix eight musical tone waveforms transmitted from the external circuit 13 via the interface circuit 25, the above-indicated thirty-two musical tone waveforms generated from the volume change control circuit 23, and eight musical tone waveforms transmitted from the signal processing circuit 26, so as to produce each of sixteen mixed waveforms. The mixer 24 then outputs eight of the obtained sixteen mixed waveforms to the external circuit 13 via the interface circuit 25, and outputs the remaining eight mixed waveforms to the signal processing circuit 26.

The external circuit 13 may be an external effecter, which imparts an effect or effects to one or more musical tone waveform(s) received from the interface circuit 25, and outputs the one or more musical tone waveform(s) provided with the effect(s) to the interface circuit 25.

The signal processing circuit 26 performs signal processing on eight mixed waveforms received from the mixer 24, outputs eight musical tone waveforms to the mixer 24, and outputs four musical tone waveforms to the DA converter 9. While the signal processing circuit 26 is capable of performing time-share signal processing based on a plurality of microprograms, any of these microprograms may use any of the eight channels of mixed waveforms received from the mixer 24, eight channels of musical tone waveforms transmitted to the mixer 24, and four channels of musical tone waveforms transmitted to the DA converter 9, and the circuit 26 is configured to be able to arbitrarily select which ones of these channels are used by each of these microprograms.

The selector 27 is provided for allowing the CPU 3 to access the delay memory 14 via the read-write circuit 28 when the signal processing circuit 26 halts or stops execution of a part of the microprograms. This selector 27 enables the CPU to access the delay memory 14 when it receives an HB signal indicating that execution of a particular microprogram is halted (each microprogram is also called an effecter block since it corresponds to one of sound effects to be imparted, and the HB signal means a halt block signal that designates an effecter block that is to be halted).

In the manner as described above, the tone generator 8 produces musical tone signals in accordance with the control signals written into the control register 21, imparts sound effects to the signals, and outputs the resulting signals to the DA converter 9.

Figure 3:
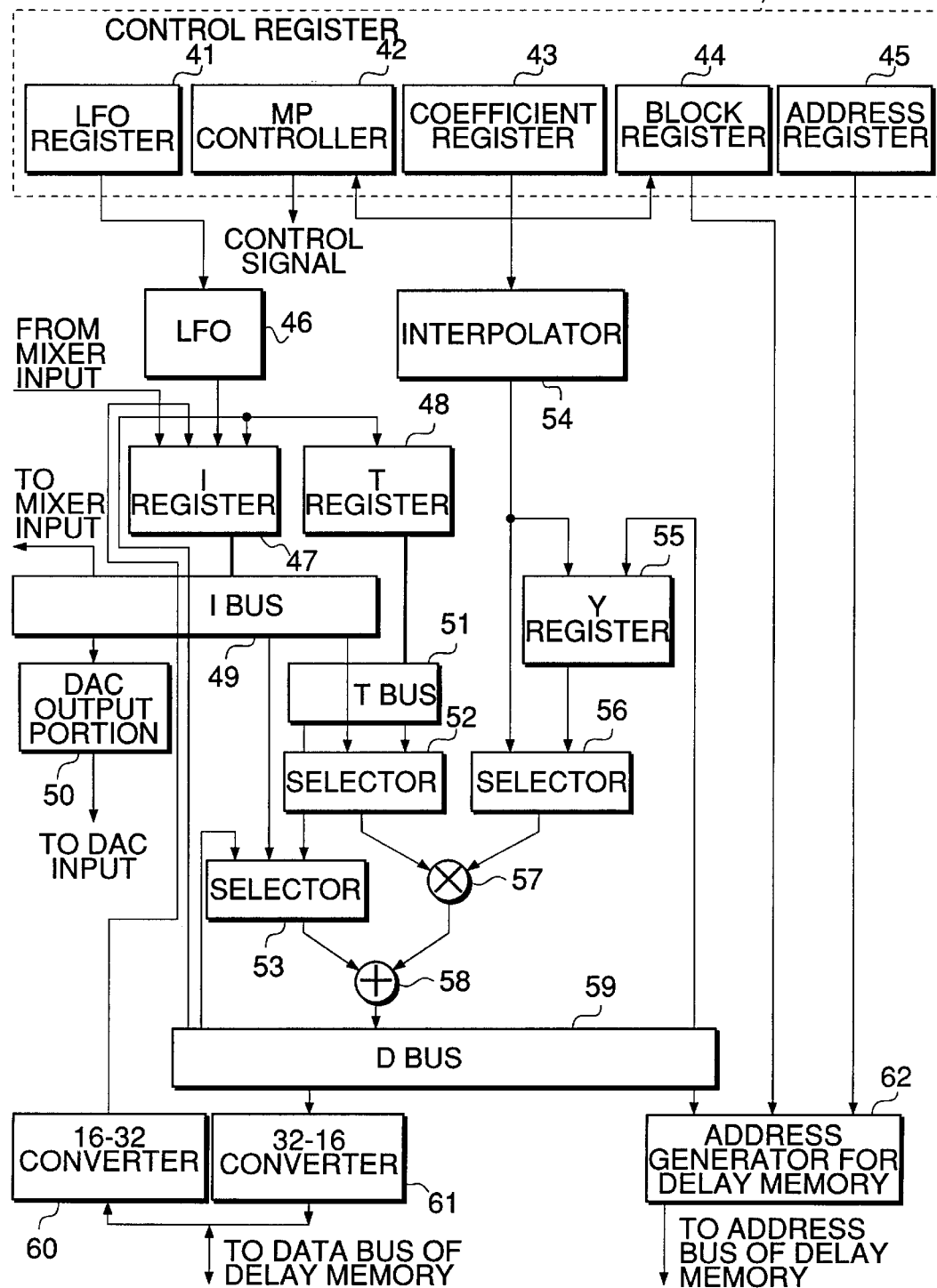
FIG. 3 is a block diagram showing the construction of a control register and a signal processing circuit appearing in FIG. 2.

FIG. 3 shows constituent elements of the signal processing circuit 26 constituted by a DSP (digital signal processor), and constituent elements of the control register 21 that supplies control signals to the signal processing circuit 26.

Figure 8:
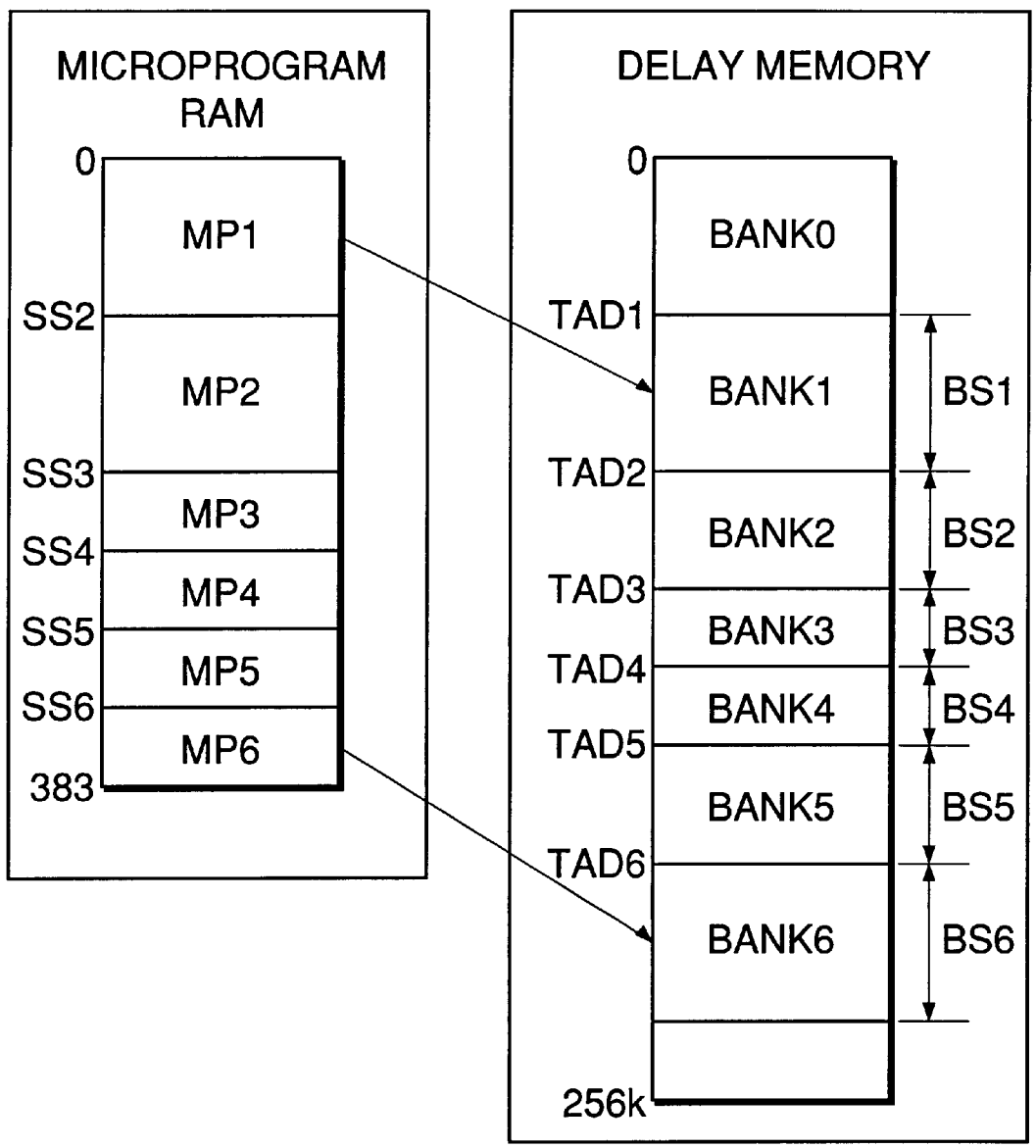
FIG. 8 is a view showing data stored in a block register appearing in FIGS. 3, 4 and 5.

Before explaining the construction of the control register 21 and that of the signal processing circuit 26 referring to FIG. 3, the relationship between the microprograms to be executed by a microprogram (MP) controller 42 of the control register 21 and banks of the delay memory 14 established with respect to the respective microprograms will be first explained referring to FIG. 8. In the example illustrated in FIG. 8, six microprograms to be executed in a time-sharing manner are stored in a microprogram RAM (hereinafter referred to as "MPRAM") 73 (shown in FIG. 4) of the MP controller 42, and six banks (memory areas) ranging from bank 1 to bank 6 corresponding to these microprograms are established in the delay memory 14. In the present embodiment, the MPRAM 73 is able to store microprograms having a total of 384 steps as counted from step 0 to step 383, and these 384 steps are divided into six microprograms MP1–MP6 in the example of FIG. 8. Each of the microprograms MP1 to MP6 performs signal delay processing, using a corresponding one of the banks 1–6 of the delay memory 14.

In execution of the microprograms having 384 steps in total and stored in the MPRAM 73, one step is read out in response to each step clock (S clock) signal generated at a frequency of 18.432 MHz (=48 kHz×384) that is 1/384 of one sampling period (1/48 kHz, which will be referred to as 1 DAC cycle) of the DA converter 9, and is converted into a control signal for controlling the signal processing circuit 26. In the present embodiment, therefore, one cycle of all of 384 steps is read out in the above-indicated 1 DAC cycle. In the example of FIG. 8, these 384 steps constitute six microprograms MP1 to MP6, and therefore the six microprograms are executed in a time-sharing manner in each DAC cycle.

In the present embodiment, the delay memory 14 has a capacity (of about 4M bit) for storing 256K (256×1000) units of 16-bit data. Bank 0 of the delay memory 14 is an area that can be accessed by any of the six microprograms, and stores table data or the like, used in common by all of the microprograms.

Referring back to FIG. 3, the control register 21 includes an LFO register 41 that supplies control parameters to a low-frequency oscillator (LFO) 46, an MP controller 42 that includes the microprogram RAM for storing a plurality of microprograms, and executes the respective microprograms in a time-sharing manner to supply control signals to a multiplier, an adder, various registers, selectors and others, and a coefficient register 43 that supplies multiplication data to the multiplier. The control register 21 further includes a block register 44 that provides the starting step number of a microprogram to be executed, bank size of the delay memory 14 that corresponds to each effecter block, and starting address of each bank of the delay memory 14, and an address register 45 that supplies address data AD to an address generator 62 for the delay memory.

The low-frequency oscillator 46 performs time-sharing 16-channel operations, so as to generate sixteen different low-frequency waveforms (modulation data). The LFO register 41 stores control parameters for controlling the frequency, amplitude, shape of waveform and others of modulation data with respect to each of the sixteen channels, so that sixteen modulation data generated by the oscillator 46 can be independently controlled. The coefficient register 43 has 384 storage areas corresponding to respective steps of the microprograms, and stores coefficients used for multiplication in the signal processing of each step. The address register 45 has 384 storage areas corresponding to respective steps of the microprograms, and stores address data AD used when accessing the delay memory 14 in the signal processing of each step.

The signal processing circuit 26 includes the low-frequency oscillator (LFO) 46 that generates modulation data for modulating musical tone data so as to impart sound effects, such as vibrato and tremolo, to the musical tone data, an interpolator 54 that performs interpolating operations on data supplied from the coefficient register 43, registers 47, 48, 55, data buses 49, 51, 59, and various selectors 52, 53, 56 for selecting data. The signal processing circuit 26 further includes a multiplier 57, an adder 58, a 32-16 converter 61 that compresses data that is written into the delay memory 14, a 16-32 converter 40 that decompresses or expands data that is read out from the delay memory 14, an address generator 62 for the delay memory that controls the address of the delay memory 14 to which data is written into and the address of the memory 14 from which data is read out, and a program bus (not illustrated) for supplying control signals from the MP controller 42 to the multiplier 57, adder 58, registers 47, 48, 55, selectors 52, 53, 56 and others.

The I register 47 has an input area that stores eight mixed waveforms generated by the mixer 24, an LFO area that stores sixteen modulation data generated by the LFO 46, a general-purpose area that stores a plurality of data, such as data that is read out from the delay memory 14 or data of operation results output onto a D bus 59, an output area that stores eight musical tone waveforms to be transmitted to the mixer 24, and a DAC area that stores musical tone waveforms to be supplied to a DAC output block 50. In response to a command generated in each step of the microprogram, a desired area on the I register 47 may be designated, and data may be read out of or written into the designated area. Where a plurality of microprograms are executed in a time-sharing manner, any one of the microprograms can access eight mixed waveforms, sixteen modulation data and other data stored in the I register 47.

The plurality of microprograms executed in a time-sharing manner have different processing algorithms (effect algorithms), and the number of inputs and the number of outputs may differ from one microprogram to another. It is desirable that each input of each microprogram receives an independently mixed waveform. In the present embodiment, a limited number of mixed waveforms, namely, eight mixed waveforms, are selectively assigned to and used by the respective microprograms. In the example of FIG. 10B, one (MP1) of a plurality of microprograms that are concurrently executed receives two mixed waveforms, and each of the other microprograms (MP2–MP4) receives one mixed waveform. Thus, an arbitrarily selected number of mixed waveforms are assigned to and input to each of the microprograms, resulting in a reduced waste as compared with the case where each microprogram receives a fixed number of given mixed waveform(s).

The number of inputs of each microprogram can be freely changed as long as the sum of the inputs of the plurality of microprograms is equal to or smaller than the number of the calculated mixed waveforms. The CPU 3 rewrites an access command of the I register 47 included in each microprogram so as to control which one(s) of the eight mixed waveforms is/are to be input to each microprogram.

While the number of mixed waveforms received by the I register 47 is eight in the present embodiment, this number may be increased or reduced by changing the design of the mixer 24.

Similarly, eight outputs are selectively allocated to the respective microprograms, and each microprogram is adapted to write a processed musical tone waveform into the output area of the I register 47 allocated to the microprogram.

Waveforms arbitrarily selected from the eight mixed waveforms, output from each microprogram or waveform that is being processed, for example, are written into the DAC area in accordance with a control signal, and the waveforms written into the DAC area is fed to the DAC output block 50 each time execution of 384 steps of the microprograms is finished (in each sampling period).

The T register 48 is a temporary register that temporarily stores the output of the adder supplied onto the D bus 59, and has a plurality of storage areas for storing a plurality of data. Like the I register 47, a desired storage area on the T register 48 may be designated in response to a command generated in each step of the microprograms, and data may be read out from or written into the designated storage area. The data read out from the T register 48 is transmitted to the selectors 52 and 53 via the T bus 51.

The selector 52 selects data from one of the I bus 49 and T bus 51 according to a control signal, and transmits the selected data to the multiplier 57. The selector 53 receives data directly from the D bus 59, and selects data from one of the I bus 49, T bus 51 and D bus 59 so that the selected data is transmitted to the adder 58. The selector 53, adder 58 and D bus 59 constitute a loop that performs accumulation.

The Y register 55 receives output data from the interpolator 54 and data from the D bus 59, and outputs data to the selector 56. The selector 56 selects one of output data from the interpolator 54 and output data from the Y register 55 according to a control signal, and transmits the selected data to the multiplier 57. The multiplier 57 multiplies the input data according to a control signal, and outputs the result of multiplication to the adder 58, which in turn adds the input data according to a control signal, and outputs the result of addition to the D bus 59. The D bus 59 is also connected to the 32-16 converter 61 and address generator 62 for the delay memory, so that the output of the adder 58 is supplied to the converter 61 and address generator 62.

The 32-16 converter 61 converts received 32-bit waveform data into 16-bit data, and outputs the resulting data to a data bus of the delay memory 14 via the selector 27 (shown in FIG. 2). On the other hand, the 16-32 converter 60 converts 16-bit data read from the delay memory 14 into 32-bit waveform data, and transmits the resulting data to the I register 47.

The address generator 62 for the delay memory receives, via the D bus 59, modulation data used for modulating address data, and also receives a bank size BS and starting address TAD of each bank from the block register 44, and address data AD from the address register 45. The address generator 62 calculates modified address data MAD based on the input data, and outputs the data MAD to an address bus of the delay memory 14 via the selector 27.

The operation of the signal processing circuit constructed as described above will be now described. Control signals generated upon execution of microprograms by the MP controller 42 are supplied to the registers, selectors and others, so as to perform suitable operations, such as multiplying data from the I register 47 by data from the Y register 55, adding data from the T register 48 to the result of multiplication, and outputting the result onto the D bus 59. Another processing may be performed in which data of the I register 47 is supplied to the 32-16 converter 61 as it is, through the I bus 49, selector 53, adder 58 and D bus 59, and stored in the delay memory 14. In this case, a control signal is supplied to the adder 58 so that the adder 58 simply allows data to pass therethrough without performing any operation on the data. Thus, the signal processing circuit 26 constructed as shown in FIG. 3 is able to perform various adding and multiplying operations and accumulating operations, for example, so as to output musical tone signals to which various sound effects are imparted.

For example, an effect of reverb may be provided by adding data that is delayed by a given time and data that is not delayed, at a suitable ratio of levels. Also, an effect of chorus may be provided by writing data into the delay memory 14, reading out the stored data at different phases (three phases of 0, 120 and 240 degrees, for example), adding the thus read data and generating the resulting data.

Figure 4:
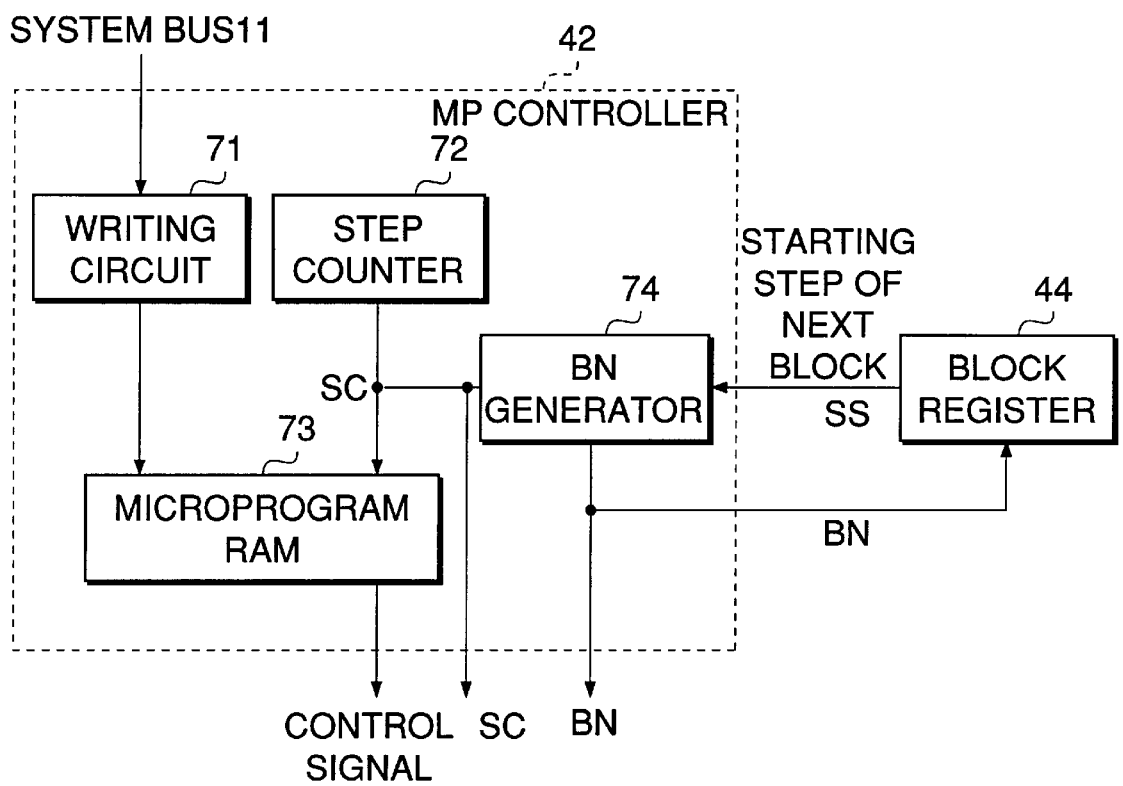
FIG. 4 is a block diagram showing the construction of an MP controller appearing in FIG. 3.

FIG. 4 shows the construction of the MP controller 42. The MP controller 42 includes the above-described MPRAM 73, a writing circuit 71 that controls writing of microprograms into the MPRAM 73, a step counter 72 that sequentially counts from 0 to 383 in each sampling period and outputs its count value (SC) as a step number, and a block number (BN) generator 74 that generates a block number BN that is the number of effecter block (microprogram). To the BN generator 74 is connected the block register 44 that has an SS register storing the starting step number SS of each microprogram corresponding to each effecter block, a TAD register storing the starting address TAD of each bank of the delay memory, and a BS register storing the size BS of each bank. In an example shown in FIG. 7 that corresponds to the example of FIG. 8, the starting step numbers SS2 to SS6 and "0" are stored in the SS register, and the starting addresses TAD1 to TAD6 are stored in the TAD register, while the bank sizes BS1 to BS6 are stored in the BS register. In this arrangement, "0" stored in the SS register indicates that the microprogram MP6 is the last microprogram, and no microprogram follows this microprogram MP6. In another example where five microprograms are stored in the MPRAM 73, the starting step numbers SS2 to SS6 and "0" are stored in the SS register. The starting step number of MP1 is always set to "0" so that all of 384 steps can be effectively used. Namely, SS1 is always set to "0", and is therefore not stored in the SS register.

In the present embodiment, the MPRAM 73 consists of a random-access memory having a capacity enough to store microprograms having a total of 384 steps, as shown in FIG. 8. The microprograms stored in the MPRAM 73 are executed by sequentially reading out steps 0 to 383 during each sampling period, such that one step is read out at a time upon receipt of a corresponding step number SC from the step counter 72, to thereby output control signals corresponding to commands of the respective steps to appropriate portions of the signal processing circuit 26.

In the example of FIG. 8, only the microprogram MP2, for example, may be changed into another microprogram without halting execution of the other microprograms MP1, MP3–MP6, in response to a command received from the switch panel 2 for changing the effect provided by the microprogram MP2. The operations within the system in this case will be described in detail.

The CPU 3 executes the following processing in response to the command of changing the effect, so as to control the above change of the microprogram MP2 through the control register 21 of the tone generator 8. Initially, the CPU 3 controls the mixer 24 so as to fade out the input and output levels of the musical tone waveform produced by the microprogram MP2. The CPU 3 then generates a command to halt execution of the microprogram MP2. The control register 21 receives the halt command from the CPU 3, and generates a halt block signal (HB signal) in response to the command for a period of execution of the microprogram MP2 (period of block number BN=2 as described later) in each sampling period. Generally, the control register 21 outputs the HB signal throughout a period in which the MP controller 42 outputs the block number BN corresponding to the microprogram to be halted. Similarly, when a command is generated to halt execution of a plurality of microprograms, the HB signal is generated throughout a period in which the MP controller 42 outputs a plurality of corresponding block numbers BN.

The selector 27 is controlled in response to control signals from the read-write circuit 28 while the HB signal is being generated in each sampling period, so that the CPU 3 can write or read data into or from the delay memory 14 via the read-write circuit 28. Also, a clear signal (CLR) is supplied from the control register 21 to the delay memory 14 in the period in which the HB signal is being generated, so as to initialize or clear the bank 2 of the delay memory 14 that corresponds to the microprogram MP2 that has been halted, using the address generator 62. The MP controller 42, on the other hand, stops reading data from the MPRAM 73 in response to signals from the step counter 72 during the period in which the HB signal is being generated, and instead allows the CPU 3 to write a microprogram into the MPRAM 73 through the writing circuit 71.

In the above period in which the HB signal is being generated, the CPU 3 reads out a microprogram that is newly selected from a plurality of microprograms stored in the ROM 4 through manipulation of switches on the switch panel 2, and writes the selected microprogram into the MP2 storage area of the MPRAM 73, while initializing or clearing the bank 2 of the delay memory 14 (setting all samples to 0). Furthermore, the CPU 3 causes the coefficient register 43 to store coefficients for use in the microprogram newly written into the MPRAM 73, sets the address register 45 for processing included in the new microprogram that uses the delay memory 14, and sets the LFO register 41 in the case where the LFO 46 is used in the new microprogram. Thereafter, the CPU 3 instructs the control register 21 to start execution of the new microprogram MP2, and controls the mixer 24 so as to fade in the input and output levels of the new microprogram MP2.

The microprograms are not necessarily changed in the above-described method, but may be changed in various other methods. For example, it is possible to halt execution of the microprograms MP1 to MP3, and write four microprograms having the smaller programs sizes into areas in which the microprograms MP1 to MP3 have been stored. In this case, new four microprograms are written into storage areas of the microprograms MP1 to MP3, and the corresponding banks 1 to 3 of the delay memory 14 are cleared, in a similar manner to the example illustrated above. At the same time, the SS register, TAD register and BS register are forwarded so as to change the microprograms MP4 to MP6 into the microprograms MP5 to MP7, and the above-indicated four microprograms are registered as MP1 to MP4. Also, bank 1 to bank 4 are newly established. After setting all of the registers, the CPU 3 controls the mixer 24 to fade in the input and output levels of the microprograms MP1 to MP4. In this case, the microprograms M5 to MP7 after forwarding the registers use the input area and output area of the I register 47 which had been used by the microprograms MP4 to MP6 before forwarding, and the new microprograms MP1 to MP4 use input and output areas of the I register 47 that are different from the above input and output areas.

Thus, in the present embodiment, a part of a plurality of microprograms may be changed into a different size or number of microprograms while keeping operations of the other microprograms. Since each register of the block register can store data for only eight effecter blocks, as shown in FIG. 7, the maximum number of microprograms that can be executed is eight.

The ROM 4 stores eleven microprograms corresponding to eleven types of sound effects, for example, and the user can select any combination of microprograms to be executed, including desired types and number of microprograms, under the above-described conditions (a maximum of eight microprograms, 384 or fewer steps, eight or less inputs, and eight or less outputs), and write these microprograms into the MPRAM 73. The same microprogram may be written into the MPRAM 73 a plurality of times.

The BN generator 74 outputs the block number BN of the block to which the microprogram that is currently read out belongs, based on the step number SC received from the step counter 72 and the starting step number SS received from the block register 44. The starting step number SS thus received is that of a microprogram following the microprogram represented by the current block number BN, and the block number BN is incremented (increased by "1") when the step number SC reaches this value. In the example of FIG. 7 having six effecter blocks in total, the block number BN starts with 1 (BN=1) when the step number SC is equal to its initial value 0, and is sequentially incremented up to 6 (BN=6) as the step number SC increases. When the step number SC reaches the final value 383 and returns to the initial value 0, the block number is also returned to 1 (BN=1).

Figure 5:
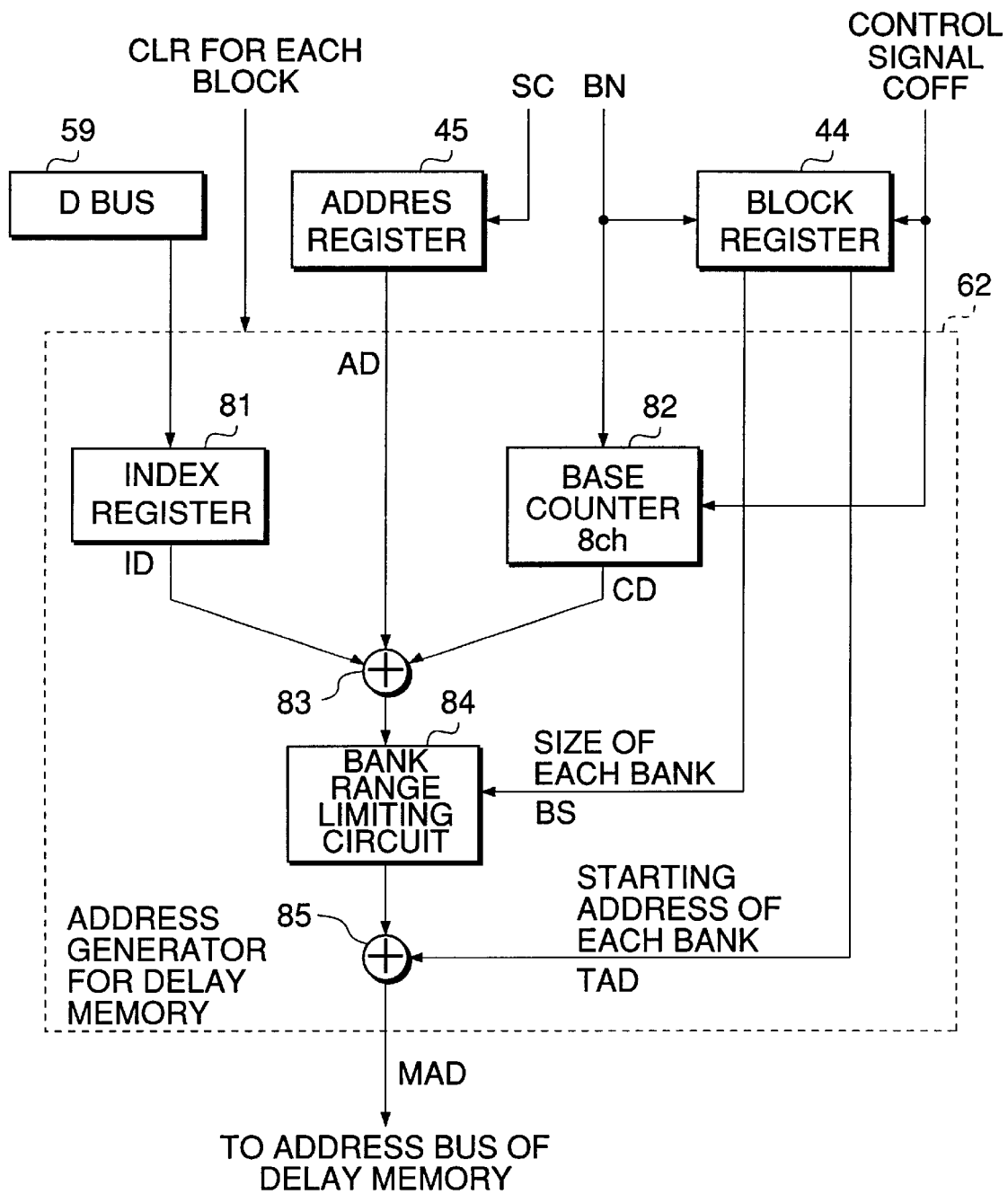
FIG. 5 is a view showing the construction of a delay memory address generator appearing in FIG. 3.

FIG. 5 shows the construction of the address generator 62 for the delay memory. The address generator 62 for the delay memory includes an index register 81 into which modulation data ID for modulating address data of the delay memory is written via the D bus 59, a base counter 82 that produces a relative address counted from the starting address TAD of each bank corresponding to each effecter block to the base position, and an adder 83 that adds output values of the index register 81, address register 45 and base counter 82. The address generator 62 further includes a bank range-limiting circuit 84 that changes the address value to within the range of the bank size BS when the output value of the adder 83 exceeds the bank size BS of the corresponding effecter block, and an adder 85 that adds the output value of the bank range-limiting circuit 84 and the starting address TAD of each bank received from the block register 44, to output a modified address MAD. The base counter 82 receives the block number BN from the BN generator 74, and receives a control signal COFF, referred to later, from the MPRAM 73. The bank range-limiting circuit 84 and adder 85 receive the bank size BS of the bank corresponding to the microprogram that is being executed and the starting address TAD of the same bank, respectively, from the block register 44. While the microprogram MP3 in the example of FIG. 8 is being executed, for example, the bank size BS3 is supplied to the bank range-limiting circuit 84, and the starting address TAD 3 is supplied to the adder 85.

The base counter 82 has eight independent counters corresponding to the maximum number of blocks that can be established, and outputs a value of one of the counters that corresponds to the period of each microprogram in one sampling period, according to the received block number BN. The individual counters of the base counter 82 that correspond to the respective microprograms MP perform different operations depending upon whether the corresponding microprogram MP is being executed (in a normal mode) or being halted (in a clear mode). Namely, each of the counters outputs a value that decrements by 1 for each DAC cycle (that is, provides a fixed value in each DAC cycle) in the normal mode, and outputs a value that decrements by 1 for each access of the delay memory 14 in the clear mode.

When the control signal COFF is generated from the MPRAM 73, the base counter 82 outputs "0" irrespective of the current block number BN. The control signal COFF is output in response to a command of the microprogram to access the bank 0 of the delay memory 14. The bank 0 is a storage area that can be accessed by any one of the microprograms, and the same data in this bank may be accessed using the same address data AD even in different DAC cycles. On the other hand, the banks 1, 2, . . . are storage areas that can be accessed only by the corresponding microprograms MP, and different data are accessed even with the same address data AD in different DAC cycles, depending upon the corresponding base count value.

In the present embodiment in which the bank size BS is represented by the nth (n is integer) power of 2, the base counter 82 consists of a counter of a suitable number of bits that is larger than the maximum value of n, and performs free counting at the above-described time interval irrespective of the bank size BS. As described later, the bank range-limiting circuit 84 masks high-order bits according to the bank size BS, and therefore the finally obtained address falls within the range of the corresponding bank. Where the bank size BS is not represented by the nth power of 2, on the other hand, it is arranged such that the base counter 82 receives the bank size BS, and repeats count-down operations within the range of the received bank size BS.

The control register 21 is arranged such that the control signal COFF is also supplied to the block register 44, and the block register 44 outputs "0" as the starting address TAD when receiving the control signal COFF.

In the present embodiment, when the output address value of the adder 83 exceeds the bank size BS, the bank range-limiting circuit 84 masks high-order bits, so that the output address value falls in the range of the bank. Where the bank size BS is not represented by the nth power of 2, and the output address value of the adder 83 exceeds the bank size BS, the bank size BS is subtracted from the output address value so that the resulting value falls within the range of the bank.

Figure 9A:
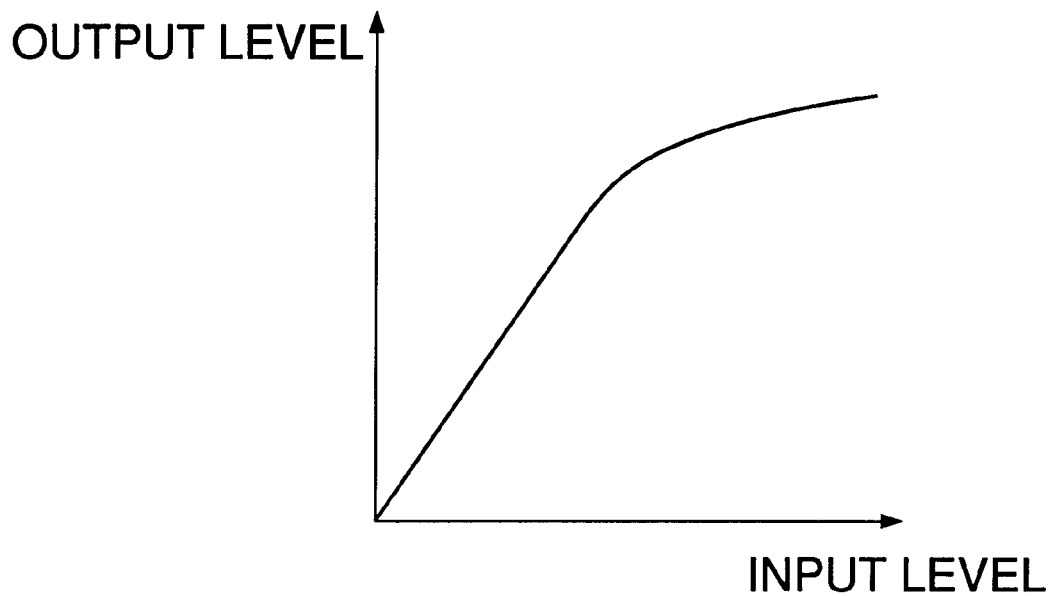
FIG. 9A is a view illustrating an example of data stored in a common area (bank 0) of a delay memory.

With the address generator 62 thus constructed as shown in FIG. 5, the microprogram MP1 is executed in the normal mode when the block number BN is equal to 1, for example, and data is written into or read out from the bank 1 of the delay memory 14, according to the control signals of the microprogram MP1 output from the MPRAM 73. In the period of BN=1, for example, if data is written at the address AD=ADw when the output value CD of the base counter 82 is equal to CDnow, the write address MAD is represented as MAD=TAD1+CDnow+ADw (assuming that the modulation data ID of the index register 81 is set to "0", and the sum of CDnow and ADw is within the range of the bank size BS1). The count value CD of the base counter 82 decrements at the end of one DAC cycle, and therefore the count value CD obtained after x DAC cycles is equal to a value represented as CD=CDnow−x. At this time, if data is read out at the address AD=ADw+x, the read address is represented as MAD=TAD1+CDnow−x+ADw+x=TAD1 +CDnow +ADw, so that the data that was written x DAC cycles before is read out. While the read-write address is basically controlled as described above, the modulation data ID supplied from the D bus 59 to the index register 81 may be controlled so as to modify the address MAD at the time of read-out from the delay memory 14. For example, if data obtained by multiplying one of sixteen modulation data output from the LFO 46 by a weight in the multiplier 57 is supplied as modulation data ID, delay waveform data that has been phase-modulated by the modulation data of the LFO 46 can be read out from the delay memory 14. Other microprograms MP2–MP6 are executed in a similar manner, and all of the microprograms MP1 to MP6 are repeatedly executed for each DAC cycle.

Where the microprogram MP1 has a command to access the bank 0, the control signal COFF is generated, as mentioned before, so that the output value CD of the base counter 82 and the starting address TAD generated by the block register 44 are both set to "0", and the address of the bank 0 is generated. The bank 0 may store an input and output table as shown in FIG. 9A, for example. With the address of the bank 0 generated, the starting address of this table is generated from the address register 45, and a difference address corresponding to the input value is generated from the index register 81. As a result, the microprogram MP1 uses a selected one of a plurality of conversion tables stored in the bank 0 of the delay memory 14, which is designated by the starting address AD, so as to determine the output value that corresponds to the input value supplied to the index register 81.

Each of the microprograms MP is able to use a command to access the bank represented by the block number BN corresponding to the currently executed microprogram, and a command to access the bank 0. The command to access the bank 0 enables any microprogram MP to access the bank 0, and the input and output table as shown in FIG. 9A, for example, may be used by all of the microprograms MP.

Figure 9B:
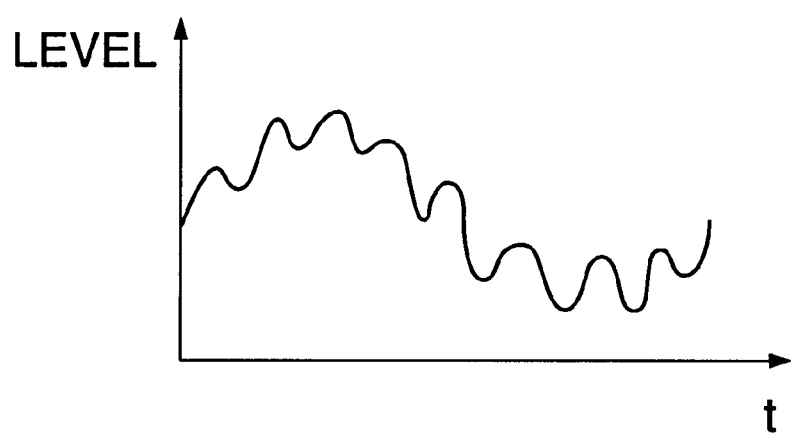
FIG. 9B is a view illustrating another example of data stored in the common area (bank 0) of the delay memory.

The data stored in the bank 0 is not limited to the table as shown in FIG. 9A, but, for example, waveform data as shown in FIG. 9B may be stored in this bank. The waveform data may be used as a waveform that provides a basis for a musical tone produced by the microprograms MP, or may be used as a waveform that controls the localization of an image or amplitude/pitch modulation when controlling effects.

The operation of the address generator 62 of FIG. 5 in the clear mode will be now explained. In this case, the control register 21 generates the HB signal and clear signal CLR in response to a command from the CPU 3, throughout the period in which the block number BN of the microprogram MP to be changed is generated, and the bank of the delay memory 14 that corresponds to the microprogram MP is placed in the clear mode. In this period, the HB signal is not generated with respect to the other microprograms that are not changed, and these microprograms are kept being executed in the normal mode.

In the clear mode, the outputs of the index register 81 and address register 45 are both set to "0", and the base counter 82 sets the size of the bank to be cleared to the initial value, and decrements its count value for each access of the delay memory 14 as described above until the count value becomes equal to "0". Where the microprogram MP1 is to be changed, for example, the CPU 3 generates a command to halt execution of the microprogram MP1, and also generates a command to clear the corresponding bank 1. In response to these commands, the control register 21 generates the HB signal and clear signal CLR only in the period of the corresponding block number BN=1, so that the operation of the clear mode is implemented.

On the other hand, the starting address of the bank 1 corresponding to the block number BN=1 is supplied as the starting address TAD throughout this period as in the normal mode, and the adder 85 adds the TAD value and the count value of the base counter 82, so as to produce an address that is decremented or counted down from the final address of the bank 1 to be cleared each time the bank 1 is accessed. Then, the 32-16 converter 61 outputs "0" to the data bus of the delay memory 14, and this data ("0") is sequentially written into the location of the above address of the delay memory 14, so that data corresponding to one address in the bank 1 is cleared at a time, starting with the final address of the bank 1. If all of the addresses of the bank 1 are not cleared in one DAC cycle, the bank 1 is kept in the clear mode in the period of BN=1 in the following DAC cycle(s), until all of the addresses in the bank 1 are cleared.

As already explained above, the effecter block held in the clear mode is called halt block, and execution of the corresponding microprogram is halted or temporarily stopped. Also, the selector 27 of FIG. 2 receives a HB (halt block) signal, and the CPU 3 is allowed to access the bank 0 of the delay memory 14 in the period allocated to the microprogram MP1. This halt block period may be utilized to rewrite or modify table data or waveform data as shown in FIGS. 9A and 9B, to thus change the content of the bank 0 with high efficiency.

The microprograms other than the microprogram MP1 may be changed in a similar manner. In addition, a plurality of microprograms may be changed at a time if a plurality of effecter blocks are placed in the clear mode (or designated as halt blocks).

Figure 6B:
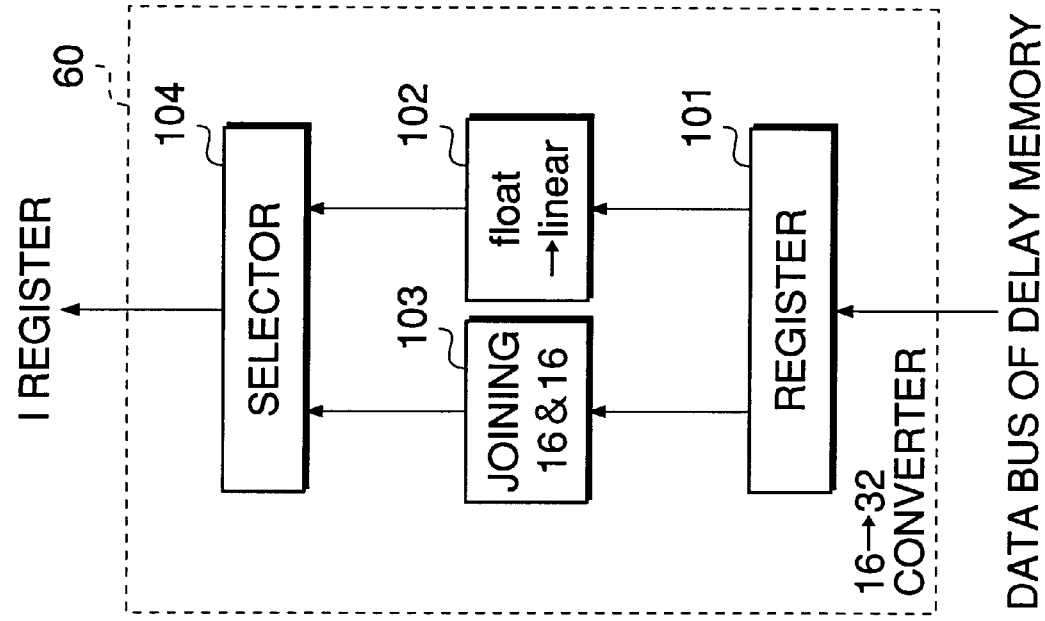
FIGS. 6A–6B are a block diagram showing the construction of a 32-16 converter appearing in FIG. 3.
Figure 6A:
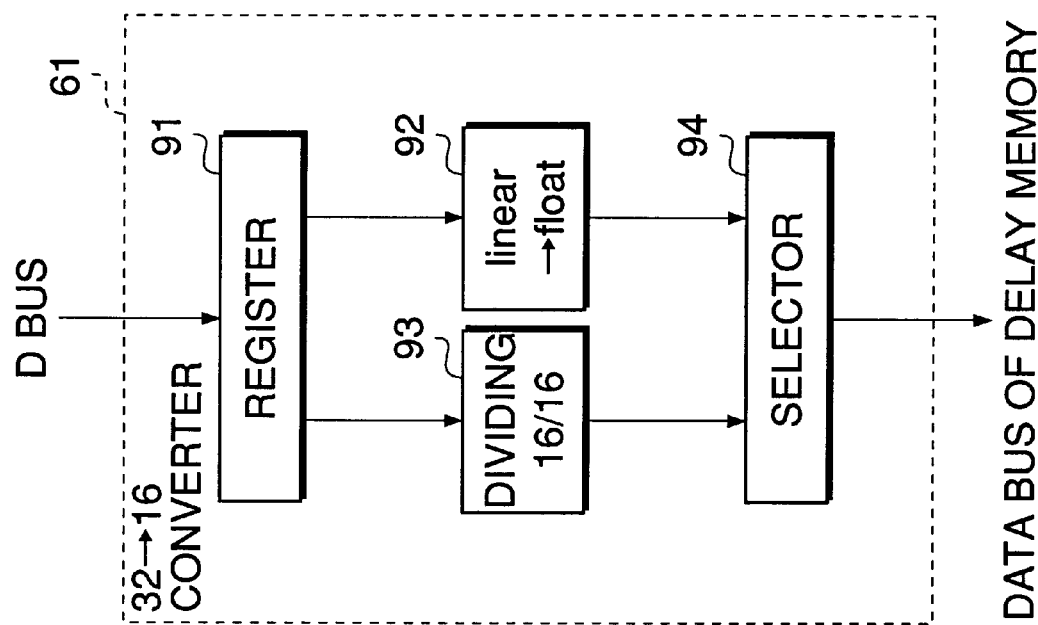

Referring next to FIGS. 6A,B, there will be described data conversion processing performed when data is written into the delay memory 14 or read out from the delay memory 14.

FIG. 6A shows the construction of the 32-16 converter 61. The converter 61 includes a register 91 connected to the D bus 59, a linear/float converter 92 that converts 32-bit integer data into 16-bit floating-point data, a 16-bit dividing block 93 that divides 32-bit integer data into two 16-bit integer data, and a selector 94 that selects one of outputs of the linear/float converter 92 and 16-bit divider 93, and outputs the selected data to the data bus of the delay memory 14. The selector 94 receives a control signal from the MP controller 42, and the above selection is made based on the control signal.

FIG. 6B shows the construction of the 16-32 converter 60. The converter 60 includes a register 101 connected to the data bus of the delay memory 14, a float/linear converter 102 that converts 16-bit floating-point data into 32-bit integer data, a 16-bit combining block 103 that combines two 16-bit integer data into 32-bit integer data, and a selector 104 that selects one of outputs of the float/linear converter 102 and 16-bit combining block 103, and outputs the selected data to the D bus 59. The selector 104 receives a control signal from the MP controller 42, and the above selection is made based on the control signal.

The control register 21 may operate in a selected one of high-accuracy mode and normal-accuracy mode when executing each microprogram. When highly accurate delay signals are needed in the processing for providing an effect or the like in each microprogram, the high-accuracy mode is selected, and the output of the 16-bit dividing block 93 is selected in the 32-16 converter 61, so that the 32-bit data is divided into two that are stored using two addresses of the delay memory 14. Where high accuracy is not required, on the other hand, the normal-accuracy mode is selected, and the output of the linear/float converter 92 is selected, so that one address of the delay memory 14 stores 16-bit data into which the 32-bit data has been compressed by a floating-point representation system. Depending upon which operation is selected in the 32-16 converter 61, the 16-32 converter 60 selects the output of the 16-bit combining block 103 in the high-accuracy mode, and selects the output of the float/linear converter 102 in the normal-accuracy mode, so that 32-bit data based on 16-bit data read from the delay memory 14 is supplied to the I register 47.

The counter of the base counter 82 that corresponds to the microprogram MP for which the high-accuracy mode is selected is decremented by two in each sampling cycle, namely, decremented at a speed that is twice as high as the speed in the normal-accuracy mode.

The high-accuracy mode and normal-accuracy mode may be selected in the following manner. The microprogram MP that receives a single-part performance waveform is executed in the normal-accuracy mode, whereas the microprogram MP that receives a mixed waveform representing a plural-part performance waveform is executed in the high-accuracy mode. Also, the normal-accuracy mode is selected when the effect processing performed in the microprogram MP involves noises, such as distortion, and the high-accuracy mode is selected when noises are desired to be avoided in the effect processing, such as reverb or normal localization control. If there is still some room in the delay memory 14 after assigning banks to a plurality of microprograms, a selected one or more of the banks may be changed to the high-accuracy mode. If the capacity of the delay memory 14 is insufficient, the bank or banks set in the high-accuracy mode may be changed to the normal-accuracy mode. Consequently, the storage area of the delay memory 14 can be saved when the accuracy need not be so high, and if necessary, highly accurate delay signals can be also obtained.

In the present embodiment as described above, the starting step numbers of microprograms stored in the MPRAM 73 are stored in the SS register of the block register 44, and the number of microprograms and the number of steps stored in the MPRAM 73 can be set to desired values within predetermined ranges (eight or fewer microprograms and 384 or fewer steps), which leads to an increased range of selection of microprograms that can be executed, and increased ease with which the electronic musical instrument is operated.

Also, the input and output channels used by each of the microprograms may be freely selected from input channels (input area of the I register 47) and output channels (output area of the I register 47) that have been established in advance, and therefore appropriate channels can be established for each microprogram. For example, four channels are established as output channels when an effect is imparted to musical tones so that they spread in three-dimensional directions (since the number of output channels to the DA converter is set to four in the present embodiment, all of the output channels are used). When an effect is imparted to musical tones so that they spread in two-dimensional directions, two channels are established for use in each of two microprograms. Thus, the limited number of output channels can be used with high efficiency. As shown in FIG. 2, the signal processing circuit 26 is provided with a total of eight channels as input channels, and a total of 12 channels as output channels, that is, four channels connected to the DA converter 9 and eight channels connected to the mixer 24.

FIGS. 10A through 10C show examples of microprograms that are executed in a time-sharing manner, indicating the number and size of the microprograms and the number of input and output channels used by each microprogram. In the example of FIG. 10A, eight microprograms (MP1 to MP8) each having 48 steps (48×8=384 steps in total) are stored in the MPRAM 73, and each microprogram uses one input channel and one output channel. In the example of FIG. 10B, one microprogram (MP1) having 192 steps, one microprogram (MP2) having 96 steps, and two microprograms (MP3, MP4) each having 48 steps are stored in the MPRAM 73. The microprogram MP1 uses two input channels and four output channels, and the microprogram MP2 uses one input channel and two output channels, while each of the microprograms MP3 and MP4 uses one input channel and one output channel. In the example of FIG. 10C, one microprogram (MP1) having 192 steps and two microprograms (MP2, MP3) each having 96 steps are stored in the MPRAM 73. The microprogram MP1 uses two input channels and two output channels, and each of the microprograms MP2 and MP3 uses one input channel and one output channel. Thus, in the present embodiment, the number of the microprograms and the number of the input and output channels used may be set to desired values in the predetermined ranges, resulting in significantly increased ease with which the electronic musical instrument is operated.

In the present embodiment as described above, the mode of the compression processing of data stored in the delay memory 14 may be changed, and the mode of the decompression processing when reading out data may be also changed according to changes in the mode of the compression processing. Thus, the storage area of the delay memory 14 may be saved where highly accurate delay signals are not needed, and if necessary, highly accurate delay signals may be still obtained.

In the arrangement in which the bank 0 of the delay memory 14 is provided as a common area to which all of the microprograms can access, table (FIG. 9A), waveform data (FIG. 9B), or the like, used by two or more microprograms may be stored in this area, without making the system complicated or increasing the cost of the system. Further, the data stored in the common area (bank 0) may be easily used by any microprogram.

The bank 0, which serves as a common area, can be easily accessed by setting both the output of the base counter 82 and the starting address TAD to "0" in response to the control signal COFF.

The CPU 3 is able to access the bank 0 of the delay memory 14 in the period in which any one of the microprograms is being halted (while the HB signal is being received), and therefore data stored in the bank 0 can be easily changed in this period.

It is to be understood that the present invention is not limited to the illustrated embodiment, but may be embodied with various changes or modifications. For example, the capacity of the MPRAM 73 may be increased so as to increase the maximum number of microprograms that can be stored in the MPRAM 73, or the capacity of the buses or registers may be increased so as to increase the number of input and output channels that can be used by the microprograms.

While two 16-bit data into which 32-bit data is divided are serially stored into one delay memory in the illustrated embodiment, two delay memories may be provided, for example, and the two 16-bit data may be stored in parallel into the two delay memories. The compression processing performed when data is stored in the delay memory is not limited to the conversion from 32-bit data into 16-bit data as in the illustrated embodiment, but may be achieved by converting 32-bit data into 24-bit data if 1.5 addresses of the delay memory are used for one data.

While the step counter 72 counts from 0 to 383 in one DAC cycle in the illustrated embodiment, the count order of the step counter 72 may be changed so that the steps in the range of 0 to 380 are read out in an arbitrary order. In this arrangement, the order in which a plurality of microprograms MP in the MPRAM 73 are read out may be changed as desired. In this case, count values whose counting order has been changed are supplied to the coefficient register 43 and address register 45, so that the orders in which multiplication data and address data AD are read out are also changed in a similar manner to the microprograms MP.

The read-out order as described above may be changed as desired, so that the microprograms that were originally executed in the order of MP1, MP2, MP3 . . . are executed in the order of MP1, MP3, MP2, or in the order of MP3, MP2, MP1, for example.

If the order of reading out a plurality of microprograms in the MPRAM 73 can be changed as desired, storage areas of two microprograms may be combined into a single, continuous storage area if the two microprograms are to be replaced by such a microprogram that has a relatively large number of steps that cannot be accommodated in either of the two storage areas, so that this microprogram can be newly written into the combined storage areas while the other microprograms are being executed.

There are some cases where the same microprogram (processing algorithm) is used for a plurality of types of effects (called "hall 3" or "distortion 2", for example). Even when a new effect type is selected, a new microprogram need not be written into the MPRAM 73 if the same microprogram is used for this newly selected effect type and an effect type produced before or after the selected effect type. In this case, the input and output levels of the corresponding microprogram are faded out so as to halt execution of this microprogram, and the bank of the delay memory used for the microprogram is cleared. At the same time, the coefficients (contents of the coefficient register 43) and the length of delay (contents of the address register 45) are set to new values while the microprogram is being halted, and the microprogram is started again by fading in the corresponding input and output levels. Namely, execution of the microprogram is halted not only when the microprogram is changed, but also when the coefficients and the length of delay are set to new values.

What is claimed is:

1. A signal processing apparatus for executing a plurality of microprograms in a time-sharing manner, so as to perform arithmetic operations on a digital signal, comprising:
   a microprogram memory device that stores said plurality of microprograms;
   a signal input device that enters said digital signal; and
   a delay memory device that delays said digital signal in a manner such that said digital signal is sequentially written into said delay memory device and then said digital signal is read out from said delay memory device after a predetermined time period;
   wherein said delay memory device has a plurality of delay areas that are independently provided for respective ones of said plurality of microprograms, such that each of the plurality of microprograms that is being executed uses a corresponding one of said plurality of delay areas so as to delay said digital signal, and a common area accessible by all of the plurality of microprograms to store and read out common data.

2. A signal processing apparatus according to claim 1, further comprising:
   an execution halting device that halts execution of a part of said plurality of microprograms while executing microprograms other than said part of the plurality of microprograms; and
   a device that allows an external processing device to access said common area of said delay memory device in an operating period that is allocated to said part of the microprograms whose execution is being halted.

3. A signal processing apparatus for executing a plurality of microprograms in a time-sharing manner, so as to perform arithmetic operations on a digital signal, comprising:
   a signal input device that enters said digital signal;
   a first memory device that stores said plurality of microprograms;
   a read-out device that sequentially reads out said plurality of microprograms in a time-sharing manner;
   a determining device that determines which one of said plurality of microprograms is being read out by said read-out device;
   a second memory device that has a plurality of delay areas corresponding to said plurality of microprograms, respectively, and a common area provided in addition to said delay areas; and
   an arithmetic processing device that performs said arithmetic operations based on the microprogram read out by said read-out device, said arithmetic operations including delay processing in which said arithmetic processing device accesses one of said delay areas that corresponds to one of said microprograms that is being executed, based on a result of determination by said determining device, and further including constant access processing in which said arithmetic processing device accesses said common area irrespective of the determination by said determining device.

4. A signal processing apparatus according to claim 3, wherein said common area of said second memory means stores at least one of a conversion table, a waveform table, and a constant table, and
   wherein said arithmetic processing device performs said constant access processing by accessing said at least one of the conversion table, waveform table, and constant table stored in said common area.

5. A signal processing apparatus comprising:
   a first memory device that stores a plurality of microprograms, and has a plurality of storage areas;
   a second memory device that stores control information indicating the storage areas which correspond to respective ones of said plurality of microprograms stored in said first memory device;
   a selecting device that selects said plurality of microprograms;
   a writing device that sequentially writes the plurality of microprograms selected by said selecting device into different ones of said storage areas of said first memory means, and writes into said second memory device said control information indicating the storage areas into which the respective microprograms are written;

a read-out device that reads out said plurality of microprograms stored in said first memory device in a time-sharing manner in each sampling period;

a processing device that performs waveform signal processing based on said plurality of microprograms read out by said read-out device;

a halt command generating device that generates a command by a user to halt a part of the waveform signal processing that is being performed by said processing device;

a determining device that determines one of the microprograms that is being read out by said read-out device, based on the control information stored in said second memory means; and a halting device that selectively halts execution of said one of the microprograms that is to be halted, according to a result of determination by said determining device, when said halt command generating device generates said command.

6. A signal processing apparatus according to claim 5, further comprising a delay memory device used when a digital signal received by the apparatus is to be delayed, said delay memory device having a storage area that is divided into a plurality of storage areas corresponding to said plurality of microprograms, respectively, said storage areas of said delay memory device being exclusively used by the corresponding microprograms.

7. A signal processing apparatus comprising:

a first memory device that stores a plurality of microprograms, and has a plurality of storage areas;

a second memory device that stores control information indicating the storage areas which correspond to respective ones of said plurality of microprograms stored in said first memory device;

a read-out device that reads out said plurality of microprograms stored in said first memory means in a time-sharing manner in each sampling period;

a processing device that performs waveform signal processing based on said plurality of microprograms read out by said read-out device;

a change command generating device that generates a command by a user to change a part of the waveform signal processing performed by said processing device into another waveform signal processing;

a determining device that determines one of the microprograms that is being read out by said read-out means, based on the control information stored in said second memory means; and a changing device that selectively halts execution of said one of the microprograms that is to be changed in response to said command generated by said change command generating device, according to a result of determination by said determining device, and writes a new microprogram into one of the storage areas corresponding to the microprogram to be changed in a period of execution of the microprogram to be changed.

8. A signal processing apparatus according to claim 7, further comprising a delay memory device used when a digital signal received by the apparatus is delayed, said delay memory device having a storage area that is divided into a plurality of storage areas corresponding to said plurality of microprograms, respectively, said storage areas of said delay memory device being exclusively used by the corresponding microprograms.

9. A signal processing apparatus for executing a plurality of microprograms in a time-sharing manner, so as to perform arithmetic operations on a digital signal, comprising:

a microprogram memory device that stores said plurality of microprograms;

a signal input device that enters said digital signal;

a first predetermined number of input channels that receive the digital signal that is to be processed;

a second predetermined number of output channels that output the digital signal that has been processed; and a setting device that determines at least one input channel of said first predetermined number of input channels to be used for each of said plurality of microprograms, and at least one output channel of said second predetermined number of output channels to be used for each of the microprograms.

10. A signal processing apparatus for executing a plurality of microprograms in a time-sharing manner, so as to perform arithmetic operations on a digital signal, comprising:

a microprogram memory device that stores said plurality of microprograms;

a signal input device that enters said digital signal;

a delay memory device used when said digital signal is delayed; and a data converting device that performs compression processing on said digital signal to write the compressed digital signal into said delay memory device, and performs decompression processing reverse to said compression processing when reading out the digital signal, so as to output the decompressed digital signal;

wherein said data converting device is able to change a first mode of said compression processing into a second mode and vice versa, and change a first mode of decompression processing into a second mode and vice versa.

11. A signal processing apparatus according to claim 10, wherein said first and second modes of the compression processing comprises a process of reducing a number of bits by floating-point conversion, and a process of dividing a unit of processing that consists of a plurality of bits.

12. A signal processing apparatus according to claim 11, further comprising:

a selecting device that selects one of a high-accuracy mode and a normal-accuracy mode with respect to each of said plurality of microprograms executed in the time-sharing manner, said high-accuracy mode being established when high accuracy is required in arithmetic operations in said each microprogram, said normal-accuracy mode being established when high accuracy is not required in the arithmetic operations;

wherein said data converting device performs the compression processing by dividing the unit of processing that consists of the plurality of bits when said selecting device selects said high-accuracy mode, and performs the compression processing by reducing a number of bits by floating-point conversion when said selecting device selects said normal-accuracy mode.

13. A signal processing apparatus for executing a plurality of microprograms in a time-sharing manner, so as to perform arithmetic operations on a digital signal to apply a plurality of effects corresponding respectively to said plurality of microprograms to said digital signal, comprising:

a first predetermined number of input channels that receive the digital signal that is to be processed;

a second predetermined number of output channels that output the digital signal that has been processed;

a plurality of mixing devices corresponding in number to said first predetermined number of input channels and associated with respective ones of said first predetermined number of input channels, said mixing devices mixing the digital signal received by said first predetermined number of input channels and the digital signal outputted from said second predetermined number of output channels to generate mixed signals corresponding in number to said first predetermined number of input channels, and inputting the mixed signals into respective corresponding ones of said first predetermined number of input channels;

an arithmetic operating device that executes said plurality of microprograms in a time-sharing manner; and a setting device that sets at least one of said first predetermined number of input channels to be used for each of said plurality of microprograms, and at least one of said second predetermined number of output channels to be used for each of said plurality of microprograms;

wherein said arithmetic operating device executes each of said plurality of microprograms to apply a corresponding one of said plurality of effects to the digital signal received by the at least one input channel set by said setting device, and outputs the digital signal with the corresponding one effect applied thereto from the at least one output channel set by said setting device.

* * * * *